Figure 1:
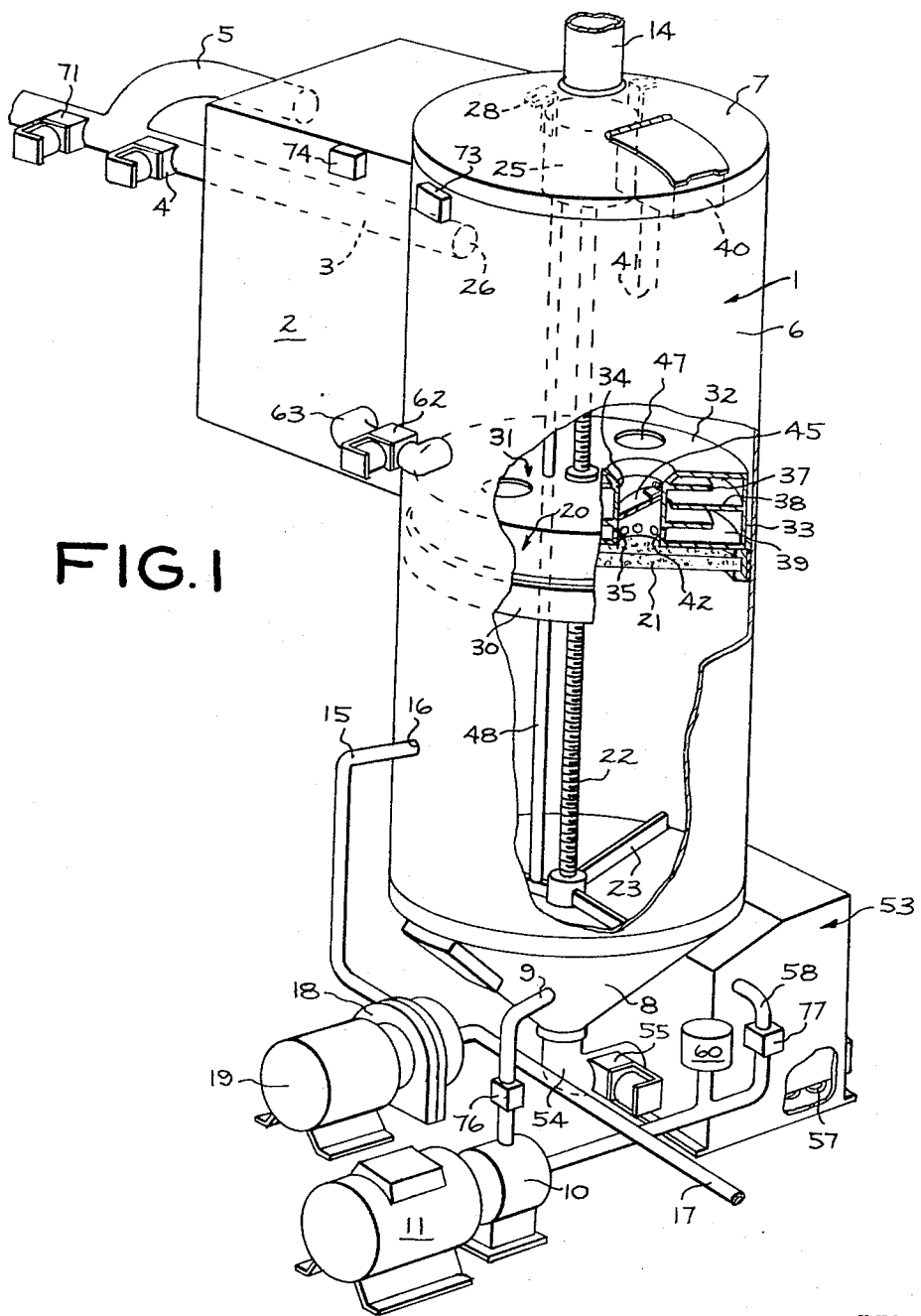

May 9, 1967 K. S. WATSON ETAL 3,318,450
HOME WASTEWATER TREATING UNIT HAVING A MOVABLE FILTER
Filed Aug. 3, 1964 2 Sheets-Sheet 1

INVENTORS
KENNETH S. WATSON
& ROBERT P. FARRELL JR.
BY *Walter E Rule*
THEIR ATTORNEY ize apparent from the following description and the fea-

United States Patent Office 3,318,450
Patented May 9, 1967

3,318,450
HOME WASTEWATER TREATING UNIT HAVING A MOVABLE FILTER
Kenneth S. Watson and Robert P. Farrell, Jr., Louisville, Ky., assignors to General Electric Company, a corporation of New York
Filed Aug. 3, 1964, Ser. No. 387,110
2 Claims. (Cl. 210—134)

The present invention relates to a home unit for the treatment of wastewater, i.e. home sewage, and is more particularly concerned with a completely self-contained, automatic wastewater treating unit adapted to produce a filtered liquid effluent suitable for disposal on or above the surface of the ground.

In many locations, the most generally used method of sewage disposal is the septic tank or cesspool. One fault with the existing septic tank and similar concepts is the soil absorption system; involving disposal of the liquid effluent under ground. The land in many areas is unsuitable for continuous absorption of substantial amounts of liquid effluent with the result that the septic tanks in such areas fail at a very high rate. A second factor which contributes to the failure of soil absorption is the solids carried into the effluent which clogs the soil pores.

A home wastewater treating unit designed to solve these and other problems of the known septic tank systems is described and claimed in the copending application Ser. No. 374,573, filed June 12, 1964, in the names of Kenneth S. Watson, Robert P. Farrell, Jr. and George E. Bennett and assigned to the same assignee as the present invention.

It comprises a treating chamber or tank for the aerobic stabilization and clarification of wastewater, a holding tank for retaining or storing wastewater during certain portions of the treatment thereof in the treating chamber and a filter chamber for filtering the liquid effluent periodically discharged from the treating chamber. The unit is designed for cycle operation and during a major portion of any one cycle, raw wastewater fed directly into the treating chamber is subjected to an aerobic digestion and stabilization treatment while during a minor portion of the cycle, after most of the solids contained in the treating chamber are allowed to settle, the supernatant liquid is discharged through the filtering chamber.

The present invention has as its principal object the provision of an improved system of the type described in the aforementioned patent application which is particularly characterized by a single tank or chamber that is employed for the aerobic treatment of wastewater as it accumulates, the separation of solids from the treated wastewater and the filtering of the supernatant liquid prior to discharge thereof from the chamber.

Another object of the invention is to provide a home wastewater treating unit including a chamber which is employed for both aerobic treatment of the wastewater and the subsequent settling of solids, which chamber includes a filter member movable between a normal or upper position above the level of wastewater in the treating chamber to a second or lower position below an outlet for the supernatant liquid and adapted during travel from the normal to the second position to remove from the supernatant liquid filterable solids suspended therein.

A further object of the invention is to provide a home wastewater treating unit including a combination aerobic treatment and settling chamber and a combined filtration and chlorination unit arranged for vertical movement within the tank for filtration and chlorination of the supernatant liquid component of the wastewater prior to discharge thereof from the chamber.

Further objects and advantages of the invention will become apparent from the following description and the features of novelty which characterizes the invention will be pointed out with particularly in the claims annexed to and forming part of this specification.

In accordance with what is presently considered to be a preferred embodiment of the present invention, there is provided a home wastewater treating unit comprising a treating chamber or tank for the aerobic stabilization of wastewater, the settling of the solids from the liquid component of the wastewater and the filtration of the supernatant liquid prior to discharge thereof from the treating chamber. The chamber includes means communicating with the upper portion of the chamber for introducing raw wastewater into the chamber and an outlet in the lower portion of the chamber for periodic discharge of filtered liquid from the chamber. The unit is designed for cycle operation and during a major portion of any one cycle, raw wastewater is fed directly into the treating chamber which includes means for diffusing air through the contents of the chamber to promote the aerobic stabilization thereof. During a minor portion of the cycle, aeration the contents of the treating chamber is discontinued and the solids therein are permitted to settle. A filtration member normally positioned within the chamber above the raw wastewater inlet is supported for movement down through the supernatant liquid following the settling operation to a position below the effluent discharge for the purpose of removing any remaining suspended material from the effluent. The filtration member is so designed that during movement of the filtration member all of the liquid in the path thereof passes through the filter. In accordance with a further aspect of the invention, the unit also includes means for introducing a liquid or solid chlorinating material into the liquid as it passes through the filter and for dissolving and intimately mixing the chlorinating material with the liquid during movement of the member to its second or lower position.

Figure 2:
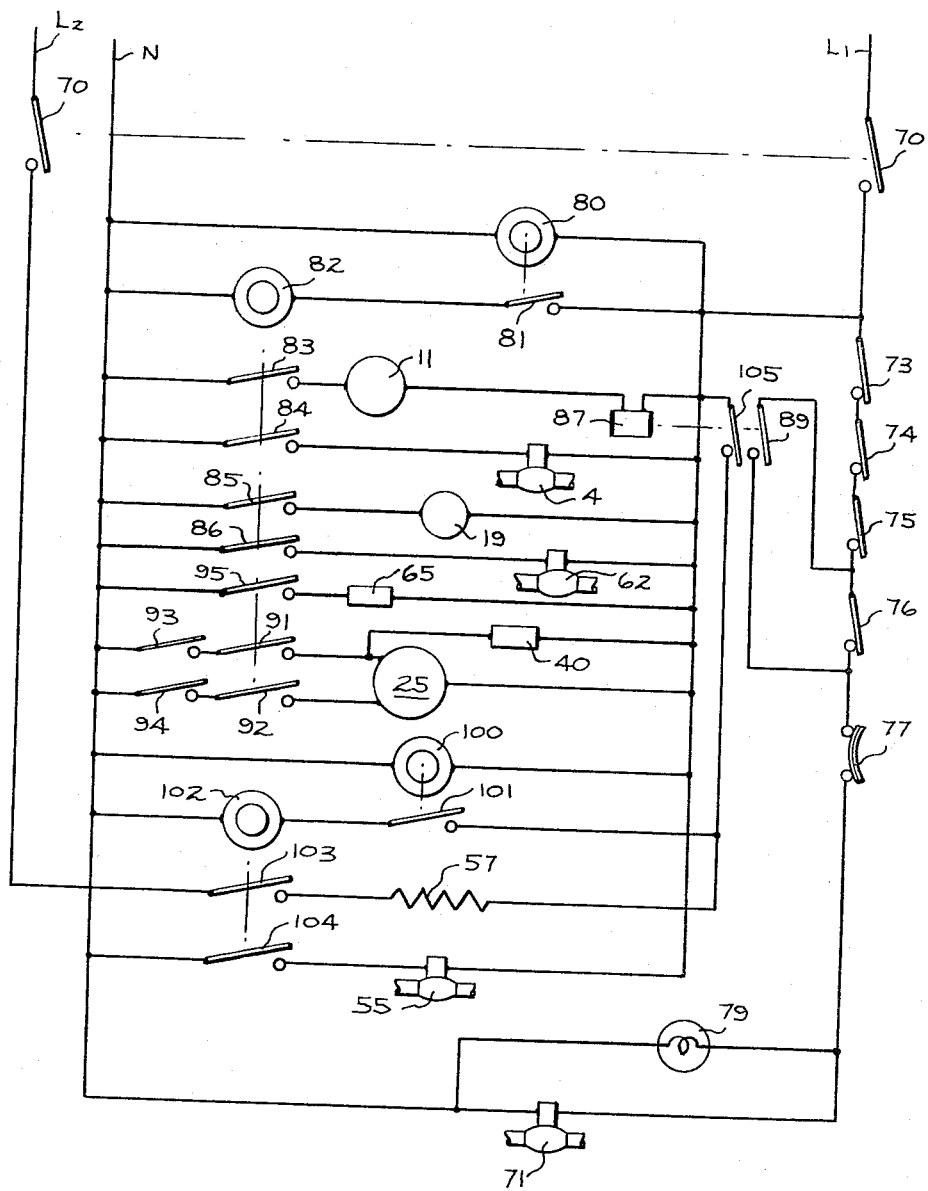

For a better understanding of the invention, reference may be had to the accompanying drawing in which:

FIGURE 1 is a perspective view partly in section of an embodiment of a home wastewater treating unit of the present invention, and FIGURE 2 diagrammatically illustrates a control circuit for the automatic control of the unit of FIGURE 1.

The unit illustrated in FIGURE 1 of the drawing comprises a treating tank or chamber 1, and a holding tank 2 preferably disposed adjacent the upper portion of the treating chamber 1. Raw household wastewater or sewage which has been previously passed through a suitable device (not shown) for cutting up the solids content thereof into the form of relatively small particles is normally fed directly into the treating chamber 1 through a conduit 3 provided with a normally open valve 4. During certain periods of operation of the unit, the valve 4 is closed and wastewater fed to the unit flows through a slightly elevated side line 5 into the holding tank 2.

The treating chamber 1 is preferably designed to have a capacity somewhat larger than the average daily wastewater output of the home during a given period so that it can be operated on a predetermined cycle. During most of each cycle of operation thereof it functions as an aeration chamber while during a minor portion of the cycle it operates first as a settling chamber and then as a filtration chamber.

The chamber includes vertical side walls 6, a top 7 and a sloping bottom wall forming a hopper 8 in which the solids collect during operation of the chamber as a settling chamber. While the side walls 6 may be of any suitable shape or configuration, in the illustrated embodiment the side walls are cylindrical.

For the purpose of introducing air into the contents of chamber 1 during operation thereof as an aerobic stabilization chamber, there is provided an air supply line 9 by means of which air from an air compressor 10 driven by a motor 11 is introduced into the lower portion of the hopper 8. The air introduced through the supply line 9 diffuses upwardly through the contents of the chamber 1 effecting a constant agitation and circulation thereof. Excess air and any gaseous products resulting from the aeration treatment are vented to the atmosphere through a vent 14 in the top wall 7 of the chamber.

A conduit 15 having its inlet end 16 connected to the lower portion of the chamber 1 above the hopper 8 and its outlet end 17 is provided for periodically discharging liquid effluent into a storm sewer or into a surface drainage network for irrigation uses or the like. When the conduit outlet 17 is above the inlet 16, the conduit 15 may include a pump 18 driven by motor 19 for elevating the discharge to the desired level. When the outlet 17 is below the inlet 16, a suitable normally closed electrically operated valve (not shown) may be substituted for the motor driven pump 18.

In order to remove any suspended solids from the effluent following a settling operation and prior to discharge of the effluent through the line 15, there is provided a movable filter member 20 including a filter element 21. The number 20 is mounted on a vertical screw drive 22 supported within the chamber on a spider 23. The screw drive 22 is adapted to be rotated in either direction by means of a reversing motor 25 for movement of the member 20 between a normal position above the discharge end 26 of the wastewater line 3 and a second position below the inlet end 16 of the effluent line 15. The motor 25 may be secured as by means of flanges 28 to the top wall 7 of the chamber so that upon rotation of the screw drive 22, the member 20 which is threadably mounted on the screw drive 22 will move vertically within the chamber 1.

A suitable resilient seal 30 may be provided about the periphery of member 20 for engagement with the side walls 6 in order to assure that, during vertical movement of the member 20, the liquid within the chamber will pass through the filter 21.

In the illustrated embodiment of the invention, the member 20 is designed to function both as a filter and as means for introducing chlorine into the supernatant liquid within the chamber 1 during downward movement of the member 20. The member 20 includes a housing 31 including a top wall 32 and cylindrical side walls 33 above the filter 21 and a tube 34 opening into the top wall 32 and extending downwardly through the housing with its lower end 35 opening onto the upper surface of the filter 21. A plurality of alternately arranged partitions or baffles 37 and 38 spaced above the filter 21 and respectively connected to the tube 34 and to the side walls 33 forms a labyrinth passage 39 within housing 31 which passage is designed to provide intimate mixing of chlorinating material periodically deposited on the filter through tube 34 with the filtered liquid as it passes through the housing.

For the purpose of feeding chlorinating material to the filter, there is provided a chlorinator 40 which stores a supply of chlorine in suitable liquid or solid form. In the illustrated embodiment, the chlorine is supplied in the form of slow-dissolving pellets of calcium hypochlorite or the like. The chlorinator 40 positioned in the upper portion of the chamber 1 has its dispensing nozzle 41 positioned to discharge one or more pellets into the upper end of the tubular member 34 during each cycle of operation so that the pellets will drop through the housing 31 onto the upper surface of the filter 21 adjacent the inlet 42 to the passage 39. A normally closed check valve 45 in the tube 34 is designed to close the tube during downward travel of the member 20 so that all of the liquid will flow through passage 39 and out through the openings 47 in the upper wall 32 of the housing and to open for supply of chlorinating material to the filter area by contact with the nozzle 41. For the purpose of assuring registry between the discharge 41 and the tubular member 34, there may be provided a vertical guide 48 to prevent the rotation of the member 20 during operation or rotation of the screw drive 22.

A portion of the solids or sludge collecting in the bottom of the treating chamber 1, or more specifically in the hopper 8, is periodicaly transferred to an incinerator 53 connected to the bottom of the hopper 8 by means of a conduit 54 provided with a normally closed valve 55. When the valve 55 is opened, the solids which are in a fluid or sludge-like state flow through the conduit 54 into the incinerator 53. Energization of an electric heating element 57 in the incinerator first removes the liquid from the sludge and therafter heats the solid residue to combustion temperatures. During this operation, the vaporized products, including the gaseous products of combustion are withdrawn from the incinerator through a conduit 58 by the air compressor 10 and become mixed with the air taken in by the compressor through the normal air intake 60. The gaseous products of combustion are thereby additionally oxidized or absorbed into the contents of the chamber 1 while any minute fly ash particles are trapped in the contents of the treating chamber and are eventually returned with subsequent sludge transferred to the incinerator.

Generally it is necessary to remove and incinerate some of the sludge collecting in hopper 8 of the treating chamber only periodically, as for example, once a week. It is also desirable that only the inert fully digested solids be removed or withdrawn for incineration without entrapping or otherwise removing the active, not fully digested solids, from the system. While differences in density cause some classification of the solids to take place during the settling operation, improved classification may be obtained by permitting a restricted passage of air through the hopper during the early stages of settling or, in accordance with the illustrated embodiment of the invention, vibration of the hopper 8 may be employed. To this end, there is included a vibrator 65 mounted on hopper 8 and adapted to be energized for vibration of the hopper portion of the chamber 1 during at least a portion of the settling period.

The holding tank 2 is designed to store raw wastewater during the period in which the treating chamber 1 is functioning as a settling and filtering chamber. When the valve 4 is closed, raw wastewater enters the holding tank 2 through the slightly elevated sideline 5. After the supernatant liquid has been drawn off from the chamber 1 following a filtration cycle and the member 20 has been returned to its normal position adjacent the upper end of the tank chamber 1, any wastewater which has accumulated in the tank 2 is discharged into the chamber 1 by opening a normally closed valve 62, in conduit 63 connecting the holding tank 2 to the chamber 1. A main valve 71 in the conduit 3 upstream from the side line 5 is designed to stop the flow of wastewater to the unit under certain malfunction or other abnormal operating conditions.

As previously described, the unit is designed for cycle operation in which a major portion of the cycle is devoted to the aeration and digestion of the wastewater in the treating chamber 1 and a shorter portion of the cycle is devoted first to the operation of the chamber 1 as the settling tank and thereafter as a filtering chamber so that only clear liquid is discharged through the conduit 15. The length of the cycle will depend to some extent upon the capacity of the unit and the service required of the unit. If the unit is designed for operation on a 24 cycle, wastewater is introduced directly into the treating chamber 1 and aerated during most of the 24 hour period, as for example from 5 a.m. to 3 a.m. while during the remaining portion of the period comprising about two hours, any wastewater fed to the unit is held in the holding tank 2 while the wastewater in the treating chamber 1 is subjected to settling and filtering operations.

Electrical control circuitry for automatically controlling the operation of the unit through a cycle is illustrated in FIGURE 2 of the drawing.

Line power is supplied to the unit by lines L1, L2 and N, energization of the unit and the control means being controlled by a main switch 70 in lines L1 and L2. The valve 71 in the conduit 3 upstream from the connection thereof to the side line 5 is connected across the lines L1 and N and is under the control of a plurality of series-connected switches including a normally closed flood float switch 73 provided in the upper portion of the treating chamber 1 for stopping the operation of the system in the event that the treating chamber becomes filled beyond its normal operating level, a second similar normally closed high level or flood switch 74 provided in the holding tank 2, a normally closed chlorinator switch 75 designed to open if the supply of chlorinating material in the chlorinator 40 is allowed to become exhausted, a normally closed air pressure switch 76 designed to open upon failure of the air flow system including the compressor 10 and the motor 11 and a high temperature incinerator thermostat switch 77 designed to open upon occurrence of abnormally high temperatures in the incinerator 53. It will be noted that each of these switches are safety switches designed to stop the flow of wastewater to the unit in the case of certain malfunctioning or abnormal conditions. A warning light 79 or the like which is actuated by the absence of voltage across it and is energized by a separate source of power such as a battery (not shown) may be used as a means for immediately notifying the homeowner of interruption of the operation of the unit.

A treating cycle timer 80 connected across the lines L1 and N and operated for example on a 24 hour cycle, or as an alternative a suitable liquid level switch in the treating tank 1, is provided for periodically closing a switch 81 to energize a program timer motor 82. The program timer motor 82 operates a plurality of timer switches for stopping aeration of and the flow of wastewater to the chamber 1 and for controlling the operation of the unit during the minor portion of the operating cycle, that is, during the time that the chamber 1 operates as a settling chamber and as a filter chamber.

More specifically, the program timer motor 82 operates a plurality of switches including a switch 83 for controlling the energization of the air compressor motor 11, a switch 84 for controlling the operation of the valve 4, a switch 85 for controlling the operation of the effluent pump motor 19, and a switch 86 for controlling the operation of the valve 62 for transferring wastewater stored in the holding tank 2 into the main treating tank 1. In series connection with the switch 83 and the air compressor motor 11 is a relay coil 87 for operating a switch 89 bypassing the air pressure switch 76 so that during that portion of the cycle when the compressor is supposed to be off, opening of the air pressure switch 56 will not cause main valve 71 to close.

The operation of the filter motor 25 is also controlled by the timer 82 through switch means 91 and 92, the closing of switch 91 causing the motor to operate in one direction to lower the filter member 20 from its normal upper position to its lower position within the tank 1 while the closing of switch 92 is designed to reverse the filter motor and raise the filter member 20 back to its normal position in the upper portion of the chamber 1. In series connection with the switches 91 and 92 are limit switches 93 and 94 for limiting the travel of the filter member 20 in each of the two directions as required.

Additional controls for controlling other components of the unit include means for feeding pellets of chlorinating material from chlorinator 40 to the filter member 20 at an appropriate time, as for example immediately preceding or at the time it starts its downward travel. In the illustrated control circuitry, the chlorinator 40 is actuated by operation of the switch 91 to supply the required amount of chlorinating material to member 20 during initial energization of the motor 25.

If the vibrator 65 is employed to classify the solids during the settling operation, the vibrator may be under separate control of a switch 95 which is also operated by the timer motor 82 and which is designed to energize the vibrator during all or part of the settling period.

Once the program timer motor 82 is energized by the closing of the switch 81, the switches driven thereby are designed to control a sequence of operations involving first the de-energization of the air compressor motor 11 to interrupt the flow of air into the treating tank and the closing of the valve 4 in the line 3 thereby stopping the flow of wastewater directly into the treating chamber 1.

With the air flow interrupted, the suspended solids in the wastewater contained in the chamber 1 start to settle into the hopper portion 8 and during at least the latter part of the settling period, the vibrator 65 is energized by closing the switch 95 in order to facilitate setting and classification of the settled solids. After sufficient time has been allowed for settling of substantially all of the suspended solid material, switch 91 is closed to introduce one or more pellets of chlorinating material through the normally open check valve 45 and to start the filter member 20 in its downward travel. The solid chlorinating material resting on the upper surface of the filter 21 is in the position to be contacted by and dissolved in the liquid passing through the filter and the flow of this liquid through the tubular member 34 is prevented by closing of the valve 45. As the member 20 moves downwardly through the chamber 1, the filtered liquid in passing through the labyrinths 39 becomes completely mixed with the dissolved chlorinating material and passes outwardly through the openings 47 provided in the top of the member 20. When the filter reaches its limiting downward position below the inlet end 16 to the conduit 15, the bottom limit switch 93 is opened to de-energize the motor 25.

After a suitable time interval designed to provide complete sterilization of the filtered liquid, pump motor 19 is energized to discharge the portion of the liquid above the inlet 16 to conduit 15. Closing of the filter motor switch 92 then reverses the direction of operation of the motor so that the member 20 is again elevated to its raised or normal position. During the initial upward travel of the filter, the filtered liquid contained within the labyrinth 39 and above the member 20 up to the inlet end 16 of the conduit 15 flows downwardly through the filter element 21 to backwash the element 21 and remove therefrom any solid particles or scum collected thereon.

After the member 20 has returned to its upper or normal position and been stopped by the opening of top limit switch 94, switch 86 operates to open the valve 62 for a short time so that any wastewater stored in the holding tank 2 during the time that the valve 4 has been closed will be discharged from the holding tank into the treating chamber 1. Subsequent closing of the switch 83 to energize the compressor motor 11 and the operation of the switch 84 to again open the wastewater valve 4 conditions the unit for operation on a subsequent cycle.

Generally, it is necessary to remove and incinerate a portion of the sludge settling to the bottom of the treating chamber 1 only periodically, as for example, once a week. The operation of this component of the unit is controlled by a main incinerator timer motor 100 which periodically closes a switch 101 to energize an incinerator program timer motor 102 driving timer switches 103 and 104 respectively controlling the operation of heater 57 and valve 55. Also included in the circuits with the program timer switch 101 and switch 103 is a normally open switch 105 operated by the relay coil 87 and designed to prevent the operation of the incinerator program timer 102 and the heating element 57 unless the compressor motor 11 is also energized. Energization of the incinerator program timer motor 102 operates the switch 104 to open the valve 55 for a brief period of time to permit a measured amount of sludge to be transferred from the lower portion of the hopper 8 into the incinerator combustion chamber. Only part of the solids are transferred at any one time so as not to remove partially digested solids or such an amount of the solids as to destroy the continuous bacterial action in the chamber 1. The electric heating unit 57 is then energized by the closing of the switch 103 and the contents of the combustion chamber are heated for a sufficient time at a sufficient temperature to complete the burning of all the combustible material contained therein. The only servicing required is occasional emptying of the residual ash collected in the bin 56.

It will be obvious that the functions of timer 80 may be combined with those of the incinerator main timer 100 so that the program timer motors 82 and 102 are respectively energized once a day and one a week for example, to control the operations hereinbefore described.

It will be seen that there has been provided an automatic wastewater treating unit having a number of advantages. As the member 20 moves downwardly through the chamber 1, it forms a barrier or partition between a filtered and chlorinated liquid and the unfiltered liquid and sludge contained in the bottom portion of the chamber 1. Since the periphery of the member 20 is in contact with the inner walls of the chamber 1, any scum on the surface of the wastewater within the chamber 1 is carried along by the filter while the sides of the member 20 tend to wipe the inner surfaces of the chamber 1 clean of scum and the like. Furthermore, since the filter is positioned in a horizontal plane above the bottom of the tank 1, gravity settling tends to carry solids away from the filter during washing thereof thus reducing possibilities of clogging. In addition, the unit has all of the advantages of that set forth in the aforementioned application Ser. No. 374,573 in providing an effluent wastewater free of particulate matter and of a much superior quality than can be produced by septic tanks or the like.

While there has been shown and described a specific embodiment of the present invention, it will be understood that it is not limited thereto and is intended by the appended claims to cover all modifications falling within the true spirit and scope of the invention.

What we claim as new and desire to secure by Letters Patent of the United States is:

1. A wastewater treating unit comprising:
a vertical chamber including side walls and having a raw wastewater inlet in the upper portion thereof and an outlet in the lower portion thereof and means for periodically introducing air into said chamber to aerate the wastewater contained therein,
a member mounted in said chamber for movement between a normal position above said inlet and a second position below said outlet,
said member including a peripheral edge portion in sliding engagement with said chamber side walls,
said member comprising a filter for removing suspended solids from said wastewater during movement of said member to its second position, said filter forming a bottom wall portion of said member, said member including walls forming a labyrinth passage above said filter having its inlet in communication with the upper surface of said filter,
means disposed above said member for dispensing solid pellets of chlorinating material to said member when it its upper position,
said member including a vertical passage communicating with the inlet end of said labyrinth passage and adapted to convey pellets from said dispensing means to said inlet end,
and a check valve in said vertical passage for preventing flow of wastewater therethrough during downward movement of said member.

2. A wastewater treating unit comprising:
a vertical chamber including side walls and having a raw wastewater inlet in the upper portion thereof and an outlet in the lower portion thereof spaced from the bottom of said chamber, means for periodically introducing air into the bottom of said chamber to aerate the wastewater contained therein, and means for periodically removing sludge from the bottom of said chamber,
a member mounted in said chamber for movement between a normal position above said inlet and a second position below said outlet,
said member including a peripheral edge portion in sliding sealed engagement with said chamber side walls and including a housing and a filter element below said housing for removing suspended solids from said wastewater during movement of said member to its second position,
said housing including top and bottom walls, a tube opening into said top wall and extending to a point spaced from said bottom wall, and a plurality of portions surrounding said tube and defining a labyrinth passage within said housing having its inlet communicating with the lower end of said tube and an outlet in the top wall of said housing,
drive means effecting movement of said member,
means disposed above said member for dispensing solid pellets of chlorinating material into the upper end of said tube upon initial downward movement of said member towards its second position, and means operable when said member is in its second position for removing liquid from above said member through said outlet.

References Cited by the Examiner

UNITED STATES PATENTS

| | | | |
|---|---|---|---|
| 1,386,340 | 8/1921 | Wuster | 210—359 |
| 1,705,908 | 3/1929 | De Witt | 210—359 X |
| 2,142,947 | 1/1939 | Kretzschmar et al. | 23—311 |
| 2,228,017 | 1/1941 | Pecker | 210—206 X |
| 2,742,381 | 4/1956 | Weiss et al. | 23—267 X |

FOREIGN PATENTS 1,319 10/1897 Demark.

REUBEN FRIEDMAN, *Primary Examiner.*

F. SPEAR, *Assistant Examiner.*